United States Patent [19]
Melinat

[11] Patent Number: 5,139,117
[45] Date of Patent: Aug. 18, 1992

[54] DAMPED DISC BRAKE ROTOR

[75] Inventor: Wolfgang Melinat, Dayton, Ohio

[73] Assignee: General Motors Corporation, Detroit, Mich.

[21] Appl. No.: 572,644

[22] Filed: Aug. 27, 1990

[51] Int. Cl.$^5$ .............................................. F16D 65/10
[52] U.S. Cl. ..................... 188/218 XL; 188/264 AA; 192/30 V; 192/113 A
[58] Field of Search .... 188/218 XL, 264 A, 264 AA, 188/18 A, 73.1; 192/30 V, 113 A; 74/574

[56] References Cited

U.S. PATENT DOCUMENTS

| | | | |
|---|---|---|---|
| 2,368,985 | 2/1945 | Heater | 188/218 XL |
| 3,198,295 | 8/1965 | Fangman et al. | 188/218 XL X |
| 3,301,356 | 1/1967 | Pompa | 188/218 XL X |
| 3,403,758 | 10/1968 | Stout | 188/218 XL X |
| 3,605,968 | 9/1971 | Ely | 188/218 XL X |
| 3,904,000 | 9/1975 | Berger | 188/218 XL |
| 4,913,267 | 4/1990 | Campbell et al. | 188/218 XL |

Primary Examiner—Robert J. Oberleitner
Assistant Examiner—Josie Ballato
Attorney, Agent, or Firm—Ernest F. Helms

[57] ABSTRACT

A massive, stiff disc brake rotor is provided which is modified by providing cuts through part or all of the rotor section having the friction braking surfaces. In a preferred embodiment, the cut has an interlocking conformation so that there is less potential for radial distortion of the disc under heavy centrifugal loads. The cut allows the rotor to vibrate axially while interrupting the propagation and amplification of circumferential waves, letting the rotor act more like a diametral spring instead of a bell. Depending on rotor inertia and braking forces to be applied, the cut can extend axially through parts of the rotors, or only partially through one or more rotor parts.

7 Claims, 5 Drawing Sheets

FREQUENCY RESPONSE OF ROTORS OF FIGURES 1 AND 5 BEFORE CUTTING SLOT

FIG.3

PRIOR ART

FREQUENCY RESPONSE OF
ROTOR OF FIGURE 1

FREQUENCY RESPONSE OF ROTOR
OF FIGURE 5

FREQUENCY RESPONSE OF ROTOR OF
FIGURE 10 BEFORE CUTTING SLOT

FIG.11

PRIOR ART

FREQUENCY RESPONSE OF ROTOR
OF FIGURE 9

FIG.12

DAMPED DISC BRAKE ROTOR

FIELD OF THE INVENTION

The invention relates to disc brake rotors and more particularly to a rotor construction and method which damps undesirable noises created or amplified in the rotor when the disc brake is actuated.

BACKGROUND OF THE INVENTION

Disc brakes are prone to generating undesirable noises during braking which are variously described as squeals, chirps, grunts, and moans. These noises are generated in the disc brake rotors by pressurized application of the brake linings to the rotors as the rotors are rotating. The more severe noises lead to extensive warranty costs, and in some instances require replacement of the linings and the rotors. This may involve any number of modifications, such as changing the lining materials, hardness, friction coefficients, or shapes, and the addition of various chamfers and grooves to the linings. Various connections with the brake shoe backing plates on which the linings are mounted have been used, including providing a sound-deadening material between the linings and the backing plates. The rotor may have a different finish, different materials, and rotor design modifications such as variable spacing of the vanes of vented rotors are often used. Even then, the brakes may not be sufficiently quiet to satisfy the dissatisfied customer, leading to loss of future sales by the vehicle manufacturer. This has been found to be particularly true in heavy duty brakes where the disc rotors are massive, stiff and heavy. Such brakes are used in high performance vehicles such as Corvettes and Lotus vehicles, two well-known high performance vehicles from different parts of the world.

SUMMARY OF THE INVENTION

Massive, stiff disc brake rotors are modified by providing cuts through part or all of the rotor section having the friction braking surfaces. Some rotors have cuts which extend into the hub section from the rotor section. Such cuts preferably have an interlocking conformation so that there is less potential for radial distortion of the disc under heavy centrifugal loads. The cuts allow the rotor to vibrate axially while interrupting the propagation and, amplification of circumferential waves. These let the rotor act more like a diametral spring instead of a bell. Depending on rotor inertia and braking forces to be applied, the cuts can extend axially through parts of the rotors, or only partially through one or more rotor parts. They may be straight, radial cuts or zigzag-like cuts to provide interlocking portions.

DETAILED DESCRIPTION

The disc brake rotor 10 of FIGS. 1, 2, 5, 7, 9 and 10 is a large, heavy and stiff rotor of the vented type to provide additional cooling. It has a first section 12 forming a hub, a second section 14 which is an annular friction braking section, and a third section 16 which connects the first and second sections 12 and 14 together. Hub section 12 has an opening 18 defined by its inner periphery 20 and a bolt hole circle on which holes 22 are located to receive bolts, studs or other fastening means for securing the rotor to the rotatable mechanism which is to be braked. Typically such a mechanism is a vehicle wheel, and an axle, either for supporting the wheel or for supporting and driving it, will extend through opening 18.

The rotor second section 14 has axially spaced annular sides 24 and 26. Side 24 has an outer side surface 28 and an inner side surface 30. Side 26 has an outer side surface 32 and an inner side surface 34. The opposed outer side surfaces 28 and 32 define annular friction braking surfaces which are adapted to be engaged by brake shoe linings as is well known in the disc brake art. Because the rotors in which the invention has been found to be very effective are massive, stiff rotors, section 14 of the rotors of the various Figures also has an annular center plate 36 which is located axially intermediate and spaced from the inner surfaces 30 and 34 of rotor sides 24 and 26. A first set of circumferentially spaced vanes 38 and 40 extends axially between the inner surface 30 of rotor side 24 and the annular center plate 36. A second set of circumferentially spaced vanes 42 and 44, better seen in FIG. 7, extends axially between the inner surface 34 of rotor side 26 and the annular center plate 36. The circumferentially spaced spaces between the vanes of vane sets 34 and 36, together with annular center plate 36 and the respective inner surfaces 30 and 34 of rotor sides 24 and 26, define cooling passages 46 and 48 for cooling fluid, typically ambient air, to flow from the inner peripheral area of the rotor second section to its outer peripheral area. As shown, the vanes 38 and 42 of the vane sets may be of different length in relation to the other vanes 40 and 44 of the vane sets. The particular arrangement shown has full radial length vanes 38 and 42 alternately interleaved with vanes 40 and 44 of approximately half radial length, with all of the vanes terminating near the outer periphery of the rotor second section. In some instances, the vanes may not be straight radial extensions, but may be somewhat curved, as it is well known for vanes in vented disc brake rotors to be constructed at times. Even so, the vanes ultimately extend radially as above described. It will be noted in FIG. 7 that the vanes 38 and 40 of the first vane set and the vanes 42 and 44 of the second vane set are so alternated circumferentially that none of the vanes of one set are in axial alignment with any of the vanes of the other set.

Figure 9:
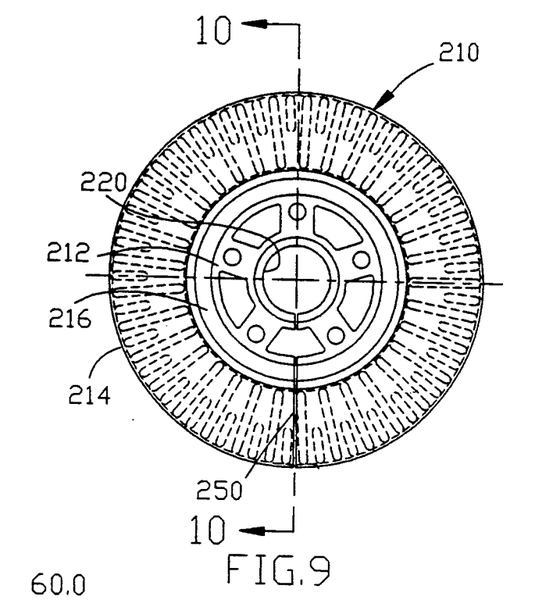
FIG. 9 is an elevation view of another large, heavy, stiff disc brake rotor similar in many respects to the rotor of FIG. 1 and embodying another modification of the invention.
Figure 10:
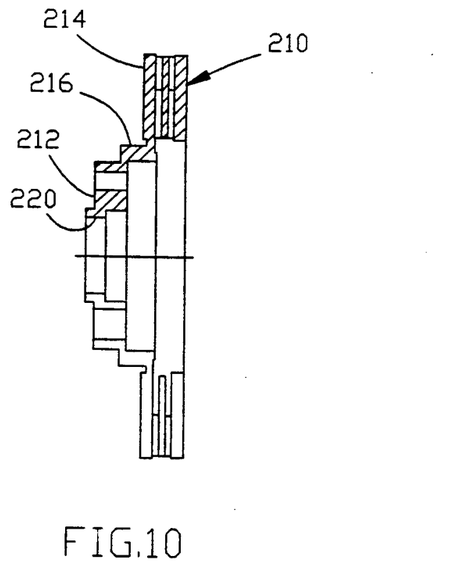
FIG. 10 is an edge view of a part of the rotor of FIG. 9 taken in the direction of arrows 10—10 of that Figure.

The third section 16 of the rotor 10 is annular and extends from the outer periphery of the first section 12 to the inner periphery of a part of the second section 14. In the rotors of FIGS. 1,2, 5 and 6, the outer periphery 46 of the hub first section 12 is located at least partially in the same plane as is the rotor annular center plate 36 of the third section 16, and the outer periphery 48 of third section 16 is joined with the inner periphery of rotor second section side 26. In the rotor of FIGS. 9 and 10, the first section 12 is more deeply offset axially from the second section 14, and the second section 16 is somewhat more cylindrical than conical. However, insofar as the invention herein disclosed and claimed, the precise shapes and relationships of the three sections of the disc rotor 10 are not critical. Each of the rotors illustrated is a large, heavy, stiff rotor of the type in use on certain high performance vehicles.

Figure 1:
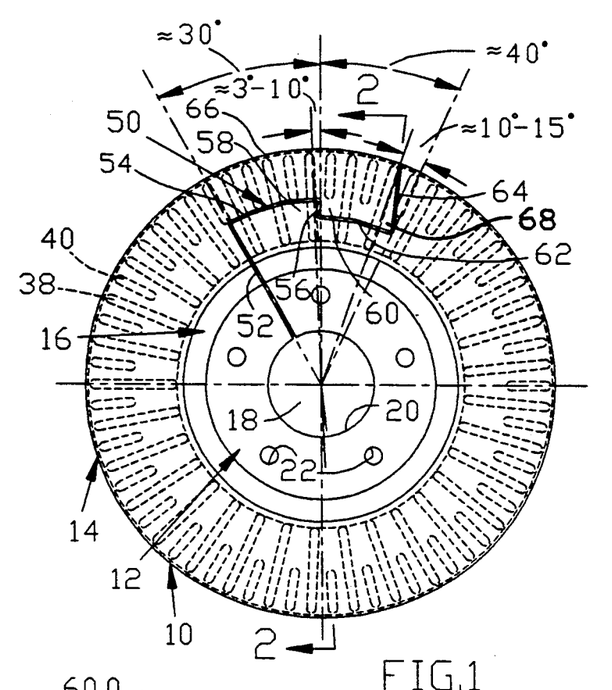
FIG. 1 is an elevation view of a large, heavy, stiff disc brake rotor embodying one version of the invention.
Figure 2:
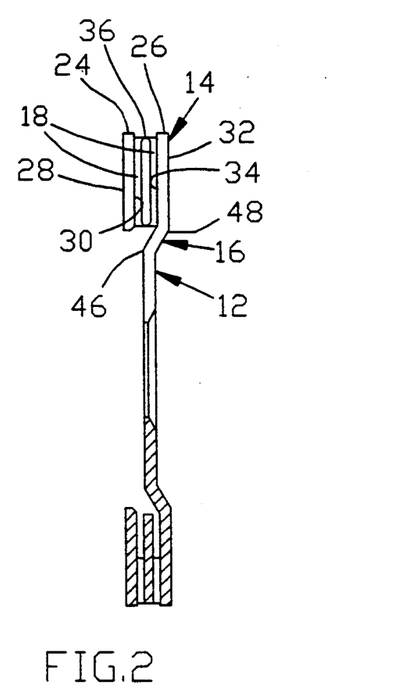
FIG. 2 is a cross section view of the rotor of FIG. 1 taken in the direction of arrows 2—2 of that Figure.

The disc brake rotor of FIGS. 1 and 2 has a slot 50 cut in it. Slot 50 (enlarged for purposes of illustration) is preferably about 0.40 mm maximum width, and may be cut by wire. Slot 50 is shown as having a doubled-back zigzag configuration. Looking at the slot 50 progressively from its innermost inward radial location to its outer location, the inner part 52 of the slot 50 extends radially to a radially intermediate arcuate portion of the rotor second section 14. A first intermediate part 54 of slot 50 then extends for a first arcuate distance of about 30° in a first arcuate (clockwise as shown in FIG. 1) direction, rightwardly as viewed in FIG. 1, through a plurality of the full radial length vanes 38 and 42. The next intermediate part 56 of slot 50 then extends with radially inward and arcuately reversed second arcuate direction (clockwise as shown in FIG. 1) components radially inward of the arc on which the first arcuate distance of part 54 is located for a relatively short second arcuate distance of about 3° to 10° (FIG. 1 illustrates an 8° example), which is less than the first arcuate distance, to provide a first radially interlocking (that is a radial line is intersecting with the slot 50 in at least two radial locations) portion defined by interlocking rotor points 58 and 60. The next intermediate part 62 of slot 50 then extends for a third arcuate distance of about 40° in the same arcuate direction (clockwise) as the intermediate part 54 extends, passing through another plurality of said full radial length vanes 38 and 42. The radius of the arc on which slot intermediate part 62 is formed is less than the radius of the arc on which slot intermediate part 54 is formed. The outermost part 64 of slot 50 then extends with radially outward and arcuately reversed components radially outward of the second arcuate distance of intermediate part 62 for a fourth arcuate distance of about 10° to 15° (FIG. 1 illustrates a 12° example), which is less than the arcuate distance of the slot part 62. The outermost part 64 of the slot extends radially outwardly all the way to the outer periphery 66 of the rotor second section 14. The reversed bend of the slot 50 where it connects its parts 62 and 64 provides a second interlocking portion, with the interlocking rotor point 68 subtending an angle somewhat less than 90°, and preferably about 75°, so that it is locked in its mating part of the rotor against radially outward deformation. With the two interlocking portions defined by the slot 50, it can be seen that even under heavy centrifugal loads the part of the rotor which is radially outward of the slot parts 54 and 62 is prevented from being deformed either radially outward or circumferentially. Of course, (in an embodiment not shown) the slot 50 may be cut only through the first and third sections 12 and 16 of the rotor and the second section rotor side 26 as well as the annular center plate 36 and certain ones of the vanes 40 positioned between the rotor side 26 and the annular center plate 36.

Figure 3:
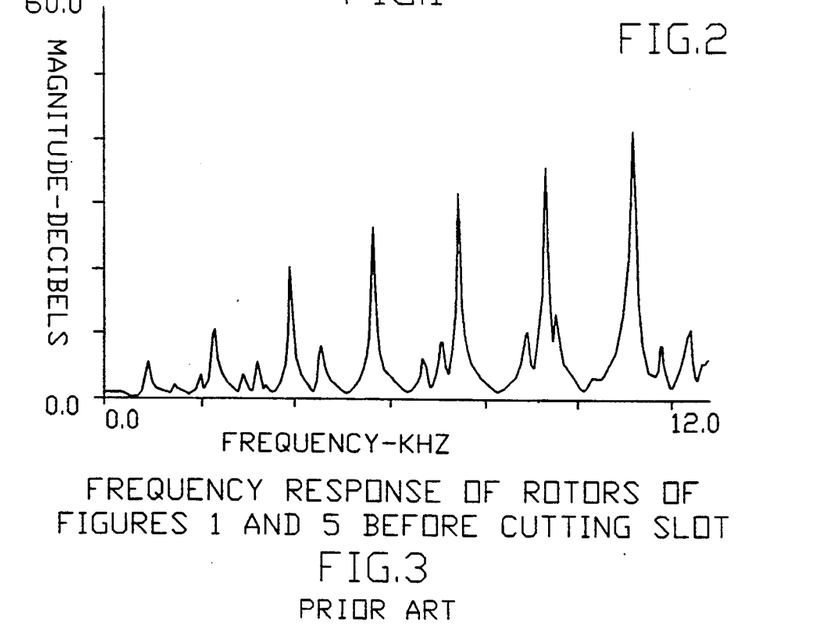
FIG. 3 is a graphic presentation of the frequency of response of the disc brake rotors of FIGS. 1 and 5 before the inventive modifications to those rotors have been made to provide a rotor embodying the invention. It shows the magnitude of brake noises in decibels plotted against the frequencies of those noises in KHz.
Figures 5, 6:
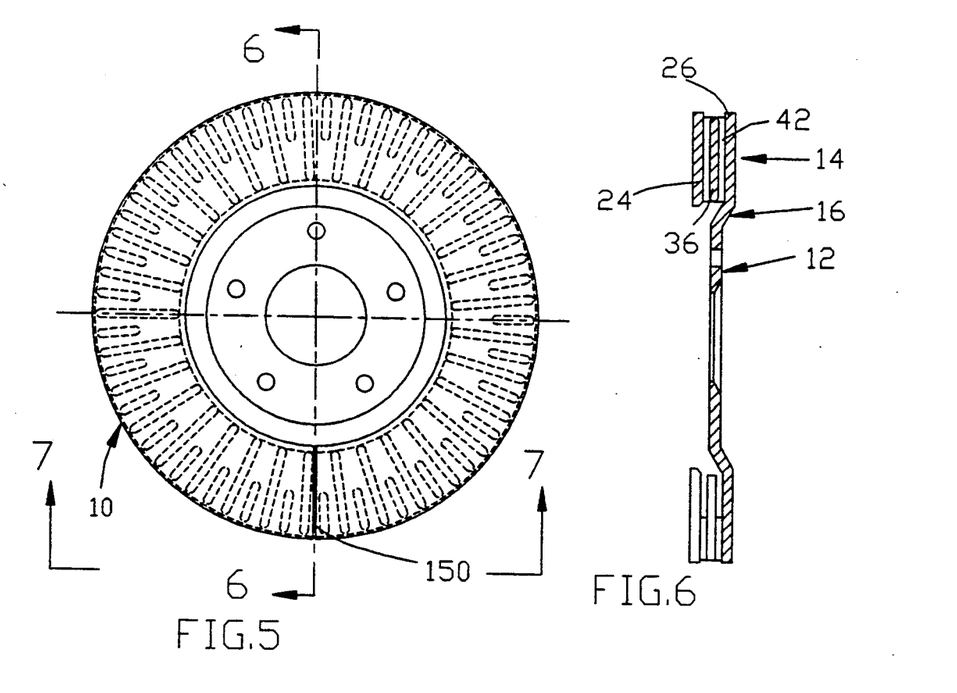
FIG. 5 is an elevation view of the same the disc brake rotor as that of FIG. 1, embodying a modification of the invention.
FIG. 6 is a cross-section view of the rotor of FIG. 5 taken in the direction of arrows 6—6 of that Figure.
Figure 7:
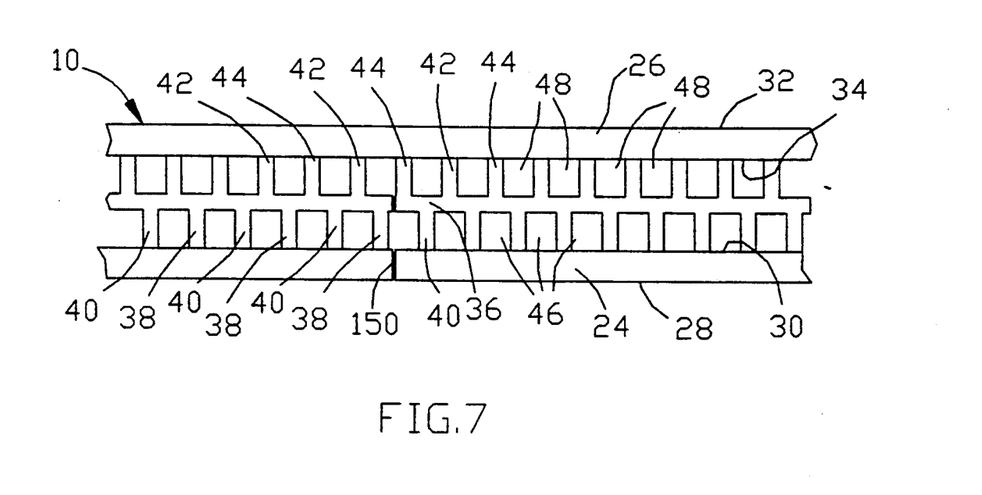
FIG. 7 is an edge view of a part of the rotor of FIG. 5 taken in the direction of arrows 7—7 of that Figure.

FIG. 3 is a graphical presentation of the response of rotors such as the rotors of FIGS. 1 and 5 before slot 50 is cut in them. it will be seen that the magnitudes, in decibels, of the noises generated in the rotor during braking increase are in a repeating pattern of major resonance peaks as the frequency of the noises increases. The peaks of these repeating noise magnitudes occur at resonant frequencies and each occurring peak evidently reinforces the following frequency peak so that the peaks become progressively greater in magnitude.

Figure 4:
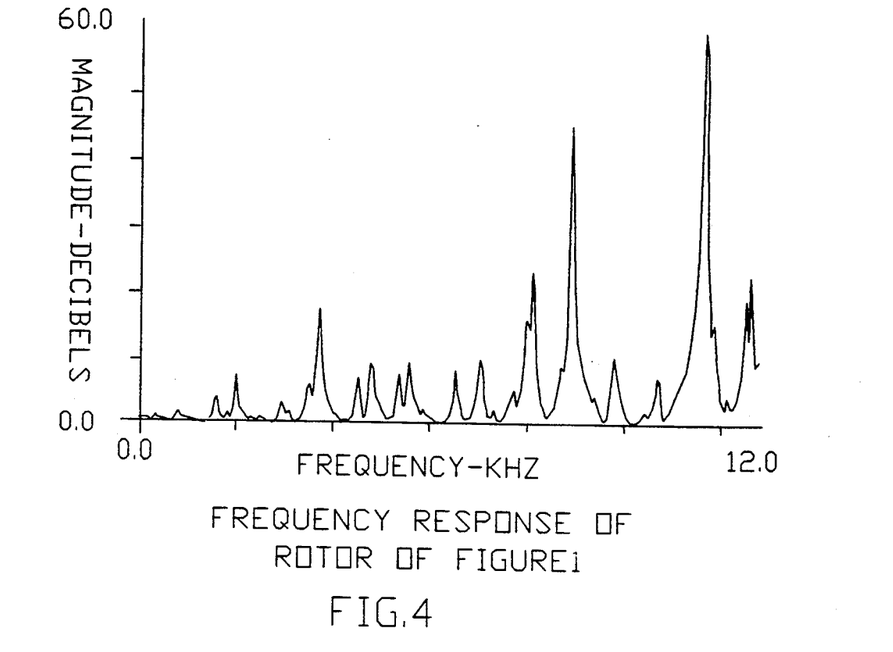
FIG. 4 is a graphic presentation similar to that of FIG. 3 showing the frequency of response of the disc brake rotor of FIG. 1 which has been modified as shown in that Figure to embody the invention.

FIG. 4 is a graphical presentation of the frequency response of the rotor of FIG. 1 after the interlocking slot 50 has been cut in it. It has lower amplitudes, fewer high peaks and some resonance shifts. Although it indicates one relatively high magnitude, that is, above 50 decibels, peak, it is a more satisfactory pattern from the standpoint of undesirable noises being generated throughout the typical noise range. There is minimum noise level below the frequency of about 9 KHz, with the peaks below that level being in the 10 to 20 decibel range.

FIG. 5 illustrates a different, more simple, slot 150 having been cut in the same type of rotor as that used in FIG. 1. Slot 150 is cut through the rotor second section side 24 and the second section annular center plate 36, passing through one of the cooling passages located between side 24 and plate 36. It extends from the outer peripheries of side 24 and plate 36 radially inward to their inner peripheries. It is preferably a maximum of 0.50 mm in width. It is preferably blade cut, since it does not go through the entire rotor second section. FIG. 6 clearly indicates the location of slot 150 in relation to the rotor sides 24 and 26, the annular center plate 36, and an overlapping pair of cooling passages 46 and 48. It is preferably parallel to a vane 38.

Figure 8:
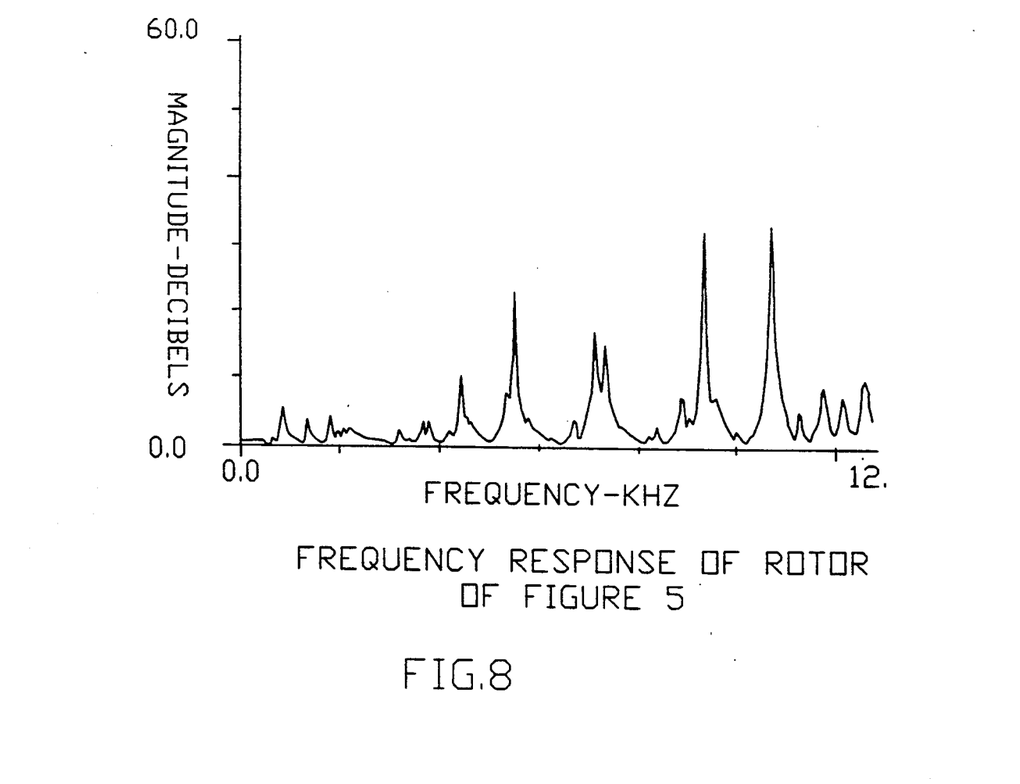
FIG. 8 is a graphic presentation similar to that of FIG. 4 showing the frequency of response of the disc brake rotor of FIG. 5.

FIG. 8 is a graphic presentation of the frequency response of the rotor of FIG. 5, that rotor having had the slot 150 cut therein. The resonance peaks have much lower amplitudes, and no high peaks. The highest peaks in the frequency range illustrated are less than 35 decibels, which is a very acceptable noise level. This construction is considerably more simple to produce than the modification using a zigzag type of slot to provide interlocking parts.

As can be noted from the description and the graphs, a single slot in a rotor appears to be sufficient to obtain very good damping results. However, it is within the purview of the invention to provide one or two additional slots which are circumferentially spaced apart. They may or may not be equally spaced, and there are some indications that it is more desirable to place them at other than equally spaced circumferential points. For example, it has been previously shown that non-equally spaced vanes can often improve the sound damping characteristics of a rotor.

FIGS. 9 and 10 show a slot 250 which is much like slot 150 in the rotor of FIG. 5. However, rotor 210 has slot 250 cut entirely through the rotor first, second and third sections from friction braking surface 28 to friction braking surface 32 and from inner periphery 220 outward to the outer periphery of the entire rotor.

Rotor 210 is a somewhat different large mass rotor from the rotor of FIGS. 1 and 5. The first section 212 of the rotor forming the hub is axially offset relative to the second section 214 of the rotor, so that none of the hub is located in a plane which is also a plane passing through the second section 214. The third section 216 of the rotor is more cylindrical in shape so as to connect the first and third sections 212 and 214.

Figure 11:
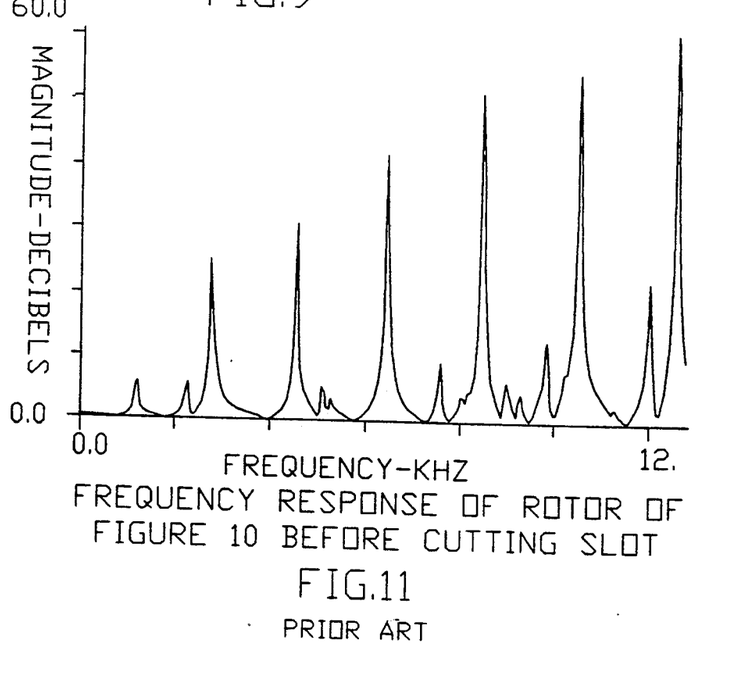
FIG. 11 is a graphic presentation similar to that of FIG. 3 showing the frequency of response of the disc brake rotor of FIG. 9 before modifying the rotor to embody the invention.

FIG. 11 is a graph of the frequency response of rotor 210 before slot 250 has been cut in it. This graph is much like the graph of FIG. 3, with much higher amplitude peaks, in the 50 decibel to over 60 decibel range for the same frequency range. There are well-defined frequency resonance characteristics which indicate a less desirable rotor from the noise standpoint.

Figure 12:
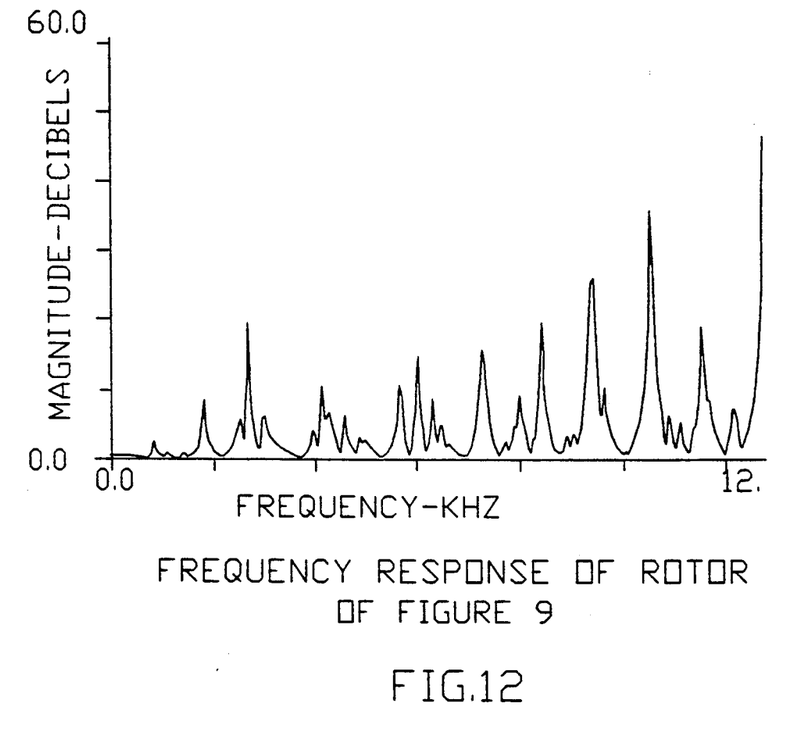
FIG. 12 is a graphic presentation similar to that of FIG. 4 showing the frequency of response of the disc brake rotor of FIG. 9 after it has been modified to embody the invention as shown in that Figure.

FIG. 12 is a graph of the frequency response of the same rotor 210 after slot 250 has been cut in it. It has characteristics more nearly like the graph shown in FIG. 8, with even lower magnitude resonance peaks that the graph shown in FIG. 4. There are resonance splits which diminish the magnitude of the peaks in them, and there are no peaks which reach a magnitude of 50 decibels. This graph, in comparison to the graph shown in FIG. 11, shows the most dramatic increase in noise damping of the three sets of graphs shown.

In all instances shown, the cutting of a slot in a large, heavy, stiff disc brake rotor substantially reduces rotor noise during braking. Evidence of this in terms of vehicle operator satisfaction was obtained by having operators drive a vehicle provided with four-wheel disc brakes the rotors of which were massive and stiff and much like the rotors of FIGS. 1 and 9. Each operator rated the noise on a scale of one to ten, with one being very severe noise and ten being no noise. When the operators drove the vehicle with rotors before any slots were cut, the noise rating was rated from one to five, with most of the operators rating it as one. When driving the same vehicle with the same rotors after the slots were cut in them, the same operators rated the noise from seven to ten, with almost all of the operators rating it at ten. These empirical tests of potential customer satisfaction were extremely convincing as to the value of the invention in such brakes.

I claim:

1. In a disc brake rotor assembly comprising a rotor with a hub first section having a plurality of circumferentially equi-spaced bolt holes and an inner radial periphery defining an opening centered around the rotational axis of the rotor, an annular friction braking second section, and a third section connecting said first and second sections, said second section having oppositely disposed and axially spaced rotor sides, an outer surfaces of said second section sides define annular friction braking surfaces, and inner surfaces of said section sides are joined by first and second sets of spaced vanes extending generally radially from the rotational axis of said rotor and said vanes extending also in an axial orientation and defining cooling passages, said cooling passages extending from the inner radial periphery to the outer radial periphery of said annular second section for the passage of cooling fluid therethrough when said rotor is rotating, means for damping noises generated in said rotor during braking, said means comprising:

an annular rotor center plate which is a part of said rotor second section, said annular center plate being located axially intermediate and spaced from said rotor sides with said first set of said vanes extending axially between one of said rotor sides and said annular center plate to define therewith a first set of circumferentially spaced cooling passages for allowing generally radial flow therethrough, and said second set of vanes extending axially between said annular center plate and the other of said rotor sides to define therewith a second set of circumferentially spaced cooling passages, said first and second sets of vanes being circumferentially offset relative to each other so that no one vane of said first set of vanes is angularly aligned with any one vane of said second set of vanes;

and slot means in at least one of said rotor sides from the outer radial periphery thereof to the inner radial periphery thereof and opening axially into at least one of said cooling passages and penetrating through said center plate from the inner radial periphery to the outer radial periphery of said center plates and said slot means penetrating from said friction braking surface formed on at least one rotor side, said slot means terminating radially of said rotor at the inner radial periphery of at least one rotor side; said slot means preventing at least one rotor side and said center plate from extending uninterruptedly throughout the circumferential direction and therefore diminishing amplification of any noises generated.

2. The disc brake rotor assembly of claim 1 in which said slot means extends in various arcuate directions as well as in various radially inward and outward directions in various portions thereof to provide radially and arcuately interlocking portions of said rotor second section for strengthened resistance to radial and arcuate deformation of said rotor under centrifugal force as said rotor is rotated at high speeds during normal use.

3. The disc brake rotor assembly of claim 1 in which said slot means extends axially through said rotor first and second and third sections and from the inner radial periphery of said rotor first section to the outer radial periphery of said rotor second section so that said slot means prevents said rotor first and second and third sections from extending uninterruptedly throughout their circumferences and therefore diminishes amplification of any noises generated therein.

4. The disc brake rotor assembly of claim 1 in which said slot means extends radially in an arcuately intermediate position between boundaries formed by radii passing through the centers of two adjacent ones of said bolt holes of said rotor first section to a radially intermediate arcuate position of said rotor second section, then for a first arcuate distance in a first arcuate direction through a plurality of said vanes, then with a radially inward component and with a second arcuate direction component reversed from the first arcuate direction being radially inward of said first arcuate distance for an arcuate distance which is less than said first arcuate distance to provide a first interlocking portion, then said slot means extends for a third arcuate distance in said first arcuate direction through another plurality of said vanes, and said slot means then extends with radially outward and arcuately reversed components with respect to said third arcuate distance for a fourth arcuate distance which is less than said third arcuate distance to the outer radial periphery of said rotor second section and providing a second interlocking portion.

5. The disc brake rotor assembly of claim 1 in which said slot means further extends radially from the outer periphery of said rotor second section to the inner periphery of said first section so that said slot means prevents said rotor first and third sections and at least said one rotor side from extending uninterruptedly throughout their circumferences and therefore diminishes amplification of any noises generated therein.

6. In a disc brake rotor assembly comprising a rotor with a hub first section having a plurality of circumferentially equi-spaced bolt holes and an inner radial periphery defining an opening centered around the rotational axis of the rotor, an annular friction braking second section, and a third section connecting said first and second sections, said second section having oppositely disposed and axially spaced rotor sides, outer surfaces of said second section sides define annular friction braking surfaces, and inner surfaces of said second section sides are joined by first and second sets of spaced vanes extending generally radially from the rotational axis of said rotor and said vanes extending also in an axial orientation and defining cooling passages, said cooling passages extending from the inner radial periphery to the outer radial periphery of said annular second section for the passage of cooling fluid therethrough when said rotor is rotating, means for damping noises generated in said rotor during braking, said means comprising:

an annular rotor center plate which is a part of said rotor second section, said annular center plate being located axially intermediate and spaced from said rotor sides with said first set of said vanes extending axially between one of said rotor sides and said annular center plate to define therewith a first set of circumferentially spaced cooling passages for allowing generally radial flow therethrough, and said second set of vanes extending axially between said annular center plate and the other of said rotor sides to define therewith a second set of circumferentially spaced cooling passages, said first and second sets of vanes being circumferentially offset relative to each other so that no one vane of said first set of vanes is angularly aligned with any one vane of said second set of vanes;

and slot means in at least one of said rotor sides from the outer radial periphery thereof to the inner radial periphery thereof and opening axially into at least one of said cooling passages and penetrating through said center plate from the inner radial periphery to the outer radial periphery of said center plates and said slot means penetrating from said friction braking surface formed on at least one rotor side, said slot means terminating radially of said rotor at the inner radial periphery of at least one rotor side, said slot means preventing at least one rotor side and said center plate from extending uninterruptedly throughout the circumferential direction and therefore diminishing amplification of any noises generated and wherein said slot means extends radially in an arcuately intermediate position between radii passing through the centers of two adjacent ones of said bolt holes of said rotor first section to a radially intermediate arcuate portion of said rotor second section, then for a first arcuate distance of about 30° in a first arcuate direction through a plurality of said vanes, then with a radially inward component and with a second arcuate direction component reversed from said first arcuate direction being radially inward of said first arcuate distance for a second arcuate distance of about 3° to 10° to provide a first interlocking portion, then said slot means extends for a third arcuate distance of about 40° in said first arcuate direction through another plurality of said vanes, and then said slot means extends with radially outward and arcuately reversed components with respect to said third arcuate distance for a fourth arcuate distance of about 10° to 15° in said second arcuate direction to the outer radial periphery of said rotor second section and providing a second interlocking portion.

7. In a disc brake rotor assembly comprising a rotor with a hub first section having a plurality of circumferentially equi-spaced bolt holes and an inner radial periphery defining an opening centered around the rotational axis of the rotor, an annular friction braking second section, and a third section connecting said first and second sections, said second section having oppositely disposed and axially spaced rotor sides, an outer surface of said second section sides define annular friction braking surfaces, and an inner surface of said second section sides are joined by first and second sets of spaced vanes extending generally radially from the rotational axis of said rotor and said vanes extending also in an axial orientation and defining cooling passages, said cooling passages extending from the inner radial periphery to the outer radial periphery of said annular second section for the passage of cooling fluid therethrough when said rotor is rotating, means for damping noises generated in said rotor during braking, said means comprising:

an annular rotor center plate which is a part of said rotor second section, said annular center plate being located axially intermediate and spaced from said rotor sides with said first set of said vanes extending axially between one of said rotor sides and said annular center plate to define therewith a first set of circumferentially spaced cooling passages for allowing generally radial flow therethrough, and said second set of vanes extending axially between said annular center plate and the other of said rotor sides to define therewith a second set of circumferentially spaced cooling passages, said first and second sets of vanes being circumferentially offset relative to each other so that no one vane of said first set of vanes is angularly aligned with any one vane of said second set of vanes;

and slot means in at least one of said rotor sides from the outer radial periphery thereof to the inner radial periphery thereof and opening axially into at least one of said cooling passages and penetrating through said center plate from the inner radial periphery to the outer radial periphery of said center plates and said slot means penetrating from said friction braking surface formed on at least one rotor side, said slot means terminating radially of said rotor at the inner radial periphery of at least one rotor side, said slot means preventing at least one rotor side and said center plate from extending uninterruptedly throughout the circumferential direction and therefore diminishing amplification of any noises generated and wherein said slot means extends radially in an arcuately intermediate position between boundaries formed by radii passing through the centers of two adjacent ones of said bolt holes of said rotor first section to a radially intermediate arcuate portion of said rotor second section, then for a first arcuate distance in a first arcuate direction through a plurality of said vanes, then with a radially inward component and with a second arcuate direction component reversed from said first arcuate direction being radially inward of said first arcuate distance for a second arcuate distance which is less than said first arcuate distance to provide a first interlocking portion, then said slot means extends for a third arcuate distance in said first arcuate direction through another plurality of said vanes, and then said slot means extends with radially outward and arcuately reversed components with respect to said third arcuate distance for a fourth arcuate distance which is less than said third arcuate distance to the outer periphery of said rotor second section and providing a second interlocking portion and wherein said slot means extends axially through said rotor first and second and third sections and from the inner radial periphery of said rotor first section to the outer radial periphery of said rotor second section so that said slot means prevents said rotor first and second and third sections from extending uninterruptedly through their circumference and therefore diminishes amplifications of any noises generated therein.

* * * * *